United States Patent
Lassenberger

(10) Patent No.: US 11,072,323 B2
(45) Date of Patent: Jul. 27, 2021

(54) METHOD FOR OPERATING AN ONBOARD NETWORK OF A HYBRID MOTOR VEHICLE AND HYBRID MOTOR VEHICLE

(71) Applicant: AUDI AG, Ingolstadt (DE)

(72) Inventor: Stephan Lassenberger, Neuhausen (DE)

(73) Assignee: AUDI AG, Ingolstadt (DE)

( * ) Notice: Subject to any disclaimer, the term of this patent is extended or adjusted under 35 U.S.C. 154(b) by 36 days.

(21) Appl. No.: 16/237,920

(22) Filed: Jan. 2, 2019

(65) Prior Publication Data

US 2019/0263380 A1 Aug. 29, 2019

(30) Foreign Application Priority Data

Feb. 26, 2018 (DE) .................... 10 2018 202 854.0

(51) Int. Cl.
*B60W 20/14* (2016.01)
*B60W 40/06* (2012.01)
(Continued)

(52) U.S. Cl.
CPC ............. *B60W 20/14* (2016.01); *B60L 58/13* (2019.02); *B60W 10/08* (2013.01); *B60W 10/22* (2013.01);
(Continued)

(58) Field of Classification Search
CPC ...... B60W 20/14; B60W 10/22; B60W 10/08; B60W 20/15; B60W 10/26; B60W 40/06;
(Continued)

(56) References Cited

U.S. PATENT DOCUMENTS 6,804,562 B2 * 10/2004 Hellwig ................. H02H 6/005
700/14
7,103,460 B1 * 9/2006 Breed ................. B60C 23/0408
701/29.1
(Continued)

FOREIGN PATENT DOCUMENTS

CN 1843560 A * 10/2006
CN 104169697 A * 11/2014 ......... G01F 23/0076
(Continued)

OTHER PUBLICATIONS

Examination Report dated Nov. 23, 2018 of corresponding German application No. 10 2018 202 854.0; 14 pages.
(Continued)

*Primary Examiner* — Behrang Badii
*Assistant Examiner* — Jalal C Coduroglu
(74) *Attorney, Agent, or Firm* — Maier & Maier, PLLC

(57) ABSTRACT

A method for operating an onboard network of a hybrid motor vehicle. The onboard network is connected to an energy storage unit, especially a battery; an electric motor of a hybrid drive train, which also has an internal combustion engine; and actuators of an electromechanical chassis system that can be operated as generators. At least one reserve capacity of the energy storage unit is kept open for the supplying of electrical energy generated by at least one portion of the actuators to the onboard network. The reserve capacity being held open is dynamically adapted as a function of at least one item of driver style information describing the driving style of the driver of the hybrid motor vehicle and/or at least one item of situation information describing the current and/or future operation of the hybrid motor vehicle.

12 Claims, 2 Drawing Sheets

(51) Int. Cl.
| | |
|---|---|
| *B60W 40/09* | (2012.01) |
| *B60W 10/22* | (2006.01) |
| *B60W 10/08* | (2006.01) |
| *B60W 20/15* | (2016.01) |
| *B60W 10/26* | (2006.01) |
| *B60L 58/13* | (2019.01) |
| *B60W 20/12* | (2016.01) |
| *B60W 10/30* | (2006.01) |
| *B60W 20/13* | (2016.01) |

(52) U.S. Cl.
CPC ............ *B60W 10/26* (2013.01); *B60W 20/15* (2016.01); *B60W 40/06* (2013.01); *B60W 40/09* (2013.01); *B60W 10/30* (2013.01); *B60W 20/12* (2016.01); *B60W 20/13* (2016.01); *B60W 2510/22* (2013.01); *B60W 2510/244* (2013.01); *B60W 2540/215* (2020.02); *B60W 2540/30* (2013.01); *B60W 2552/05* (2020.02); *B60W 2552/20* (2020.02); *B60W 2552/35* (2020.02); *B60W 2556/50* (2020.02); *B60W 2710/22* (2013.01); *B60W 2710/244* (2013.01)

(58) Field of Classification Search
CPC ........... B60W 40/09; B60W 2540/215; B60W 2552/05; B60W 2552/20; B60W 2552/35; B60W 2556/50; B60W 2510/22; B60W 20/12; B60W 10/30; B60W 2710/244; B60W 2710/22; B60W 2540/30; B60W 20/13; B60W 2510/244; B60L 58/13
See application file for complete search history.

(56) References Cited

U.S. PATENT DOCUMENTS

| | | | | |
|---|---|---|---|---|
| 7,104,347 | B2* | 9/2006 | Severinsky | B60W 10/26 180/65.23 |
| 7,261,304 | B2* | 8/2007 | Trudeau | B60G 17/0155 280/5.514 |
| 7,413,063 | B1* | 8/2008 | Davis | B60G 17/06 188/267.1 |
| 7,478,001 | B2* | 1/2009 | Fasig | G01G 19/12 177/136 |
| 7,640,083 | B2* | 12/2009 | Monroe | B64D 45/0015 701/9 |
| 7,660,654 | B2* | 2/2010 | Lu | B60W 30/04 701/36 |
| 7,661,681 | B1* | 2/2010 | Zork | B60G 9/003 280/5.514 |
| 7,705,715 | B2* | 4/2010 | Hax | G01G 23/3728 340/440 |
| 7,839,322 | B2* | 11/2010 | Filias | G05D 1/0646 342/33 |
| 7,904,235 | B2* | 3/2011 | Sato | F02D 41/00 701/123 |
| 8,374,737 | B2* | 2/2013 | Takacs | G05D 1/0676 701/17 |
| 8,384,343 | B2* | 2/2013 | Kojori | H02J 7/0013 320/104 |
| 8,396,627 | B2* | 3/2013 | Jung | B60W 40/10 701/37 |
| 8,442,706 | B2* | 5/2013 | Doeppner | G08G 5/025 701/16 |
| 8,554,458 | B2* | 10/2013 | Sawhill | G08G 5/045 701/120 |
| 8,589,071 | B2* | 11/2013 | Feyereisen | G08G 5/0021 701/457 |
| 8,620,493 | B2* | 12/2013 | Hughes | G05D 1/0083 701/3 |
| 8,633,835 | B1* | 1/2014 | Spencer | G01C 23/00 340/977 |
| 8,692,703 | B1* | 4/2014 | Dove | G08G 5/006 342/13 |
| 8,790,215 | B2* | 7/2014 | Sujan | B60W 10/26 477/5 |
| 8,825,225 | B1* | 9/2014 | Stark | G09F 21/14 701/2 |
| 8,958,942 | B2* | 2/2015 | Kolcarek | B64D 45/00 701/29.1 |
| 8,965,679 | B2* | 2/2015 | Euteneuer | G08G 5/045 701/301 |
| 8,977,407 | B2* | 3/2015 | Dorneich | G05D 1/0038 701/2 |
| 8,977,482 | B2* | 3/2015 | Ballin | G05D 1/0005 701/120 |
| 9,069,077 | B2* | 6/2015 | Hartley | G01S 13/91 |
| 9,074,891 | B2* | 7/2015 | Nutaro | G08G 5/0021 |
| 9,105,183 | B2* | 8/2015 | Samuthirapandian | G08G 5/0021 |
| 9,129,521 | B2* | 9/2015 | Gannon | G08G 5/0021 |
| 9,168,859 | B2* | 10/2015 | Krishnamurthy | G01C 23/00 |
| 9,172,481 | B2* | 10/2015 | Johnson | H04H 60/27 |
| 9,182,484 | B2* | 11/2015 | Schulte | G01S 13/91 |
| 9,268,019 | B2* | 2/2016 | Bunch | G01C 23/00 |
| 9,273,969 | B2* | 3/2016 | Parthasarathy | G06F 3/0488 |
| 9,280,904 | B2* | 3/2016 | Bourret | G08G 5/025 |
| 9,290,231 | B1* | 3/2016 | Jurrens | F16F 9/088 |
| 9,310,242 | B2* | 4/2016 | Kammann | B60T 8/1725 |
| 9,330,630 | B2* | 5/2016 | Kerofsky | G09G 3/3406 |
| 9,335,917 | B2* | 5/2016 | Dostal | G06F 3/04847 |
| 9,340,298 | B1* | 5/2016 | Dunn, Jr. | B64F 1/28 |
| 9,347,845 | B2* | 5/2016 | Gießibl | G01L 1/125 |
| 9,376,983 | B2* | 6/2016 | Moeckly | G06F 19/00 |
| 9,377,325 | B2* | 6/2016 | Behara | G01C 23/00 |
| 9,412,278 | B1* | 8/2016 | Gong | G08G 5/0091 |
| 9,437,112 | B1* | 9/2016 | Greene | G08G 5/0078 |
| 9,460,629 | B2* | 10/2016 | Chircop | G01C 23/00 |
| 9,523,984 | B1* | 12/2016 | Herbach | G05D 1/0088 |
| 9,527,601 | B2* | 12/2016 | Wyatt | G08G 5/0021 |
| 9,529,356 | B2* | 12/2016 | Mere | G06Q 10/06 |
| 9,616,870 | B2* | 4/2017 | Knechtges | B60T 8/4077 |
| 10,540,557 | B2* | 1/2020 | Cordell | B60R 1/04 |
| 10,625,005 | B2* | 4/2020 | Chang | A61M 1/064 |
| 2011/0125378 | A1* | 5/2011 | Blessing | F16D 48/06 701/68 |
| 2011/0224858 | A1* | 9/2011 | Bissontz | B60W 10/30 701/22 |
| 2012/0198962 | A1* | 8/2012 | Houle | B60K 6/442 74/661 |
| 2012/0232720 | A1* | 9/2012 | Bissontz | B60W 30/1888 701/2 |
| 2012/0239226 | A1* | 9/2012 | Bissontz | B60W 20/00 701/2 |
| 2012/0290151 | A1* | 11/2012 | Bissontz | B60W 10/06 701/2 |
| 2015/0197130 | A1* | 7/2015 | Smith | B60G 17/0155 280/124.175 |
| 2016/0075333 | A1* | 3/2016 | Sujan | B60W 10/02 701/25 |
| 2016/0090091 | A1* | 3/2016 | Gugel | B60K 6/445 701/50 |
| 2016/0257355 | A1* | 9/2016 | Siuchta | B60W 40/13 |
| 2016/0340030 | A1* | 11/2016 | Roussey | H02K 7/06 |
| 2017/0144648 | A1* | 5/2017 | Blasinski | B60W 20/12 |
| 2017/0191834 | A1* | 7/2017 | Fowe | G01C 21/10 |
| 2019/0263380 | A1* | 8/2019 | Lassenberger | B60W 10/26 |

FOREIGN PATENT DOCUMENTS

| | | | | |
|---|---|---|---|---|
| CN | 104484661 A | * | 4/2015 | ............ B62D 6/008 |
| CN | 104723822 A | * | 6/2015 | ........... B60G 21/007 |
| CN | 106494496 A | * | 3/2017 | ............ B62D 6/003 |
| CN | 107390689 A | * | 11/2017 | ........... G05D 1/0236 |
| DE | 102006045305 B3 | * | 1/2008 | ........... B60W 40/10 |
| DE | 102007015356 A1 | * | 10/2008 | ........... B60W 40/13 |
| DE | 10 2009 010 144 A1 | | 8/2010 | |
| DE | 10 2010 036 658 A1 | | 2/2012 | |
| DE | 102011004028 A1 | * | 8/2012 | ............ G01G 19/08 |

(56) References Cited

FOREIGN PATENT DOCUMENTS

| DE | 10 2011 006 433 A1 | 10/2012 | |
|---|---|---|---|
| DE | 10 2013 112 678 A1 | 5/2015 | |
| DE | 10 2014 009 448 A1 | 12/2015 | |
| DE | 10 2016 005 125 A1 | 11/2017 | |
| EP | 2793009 A1 * | 10/2014 | ............ G01N 27/72 |
| GB | 2421088 A * | 6/2006 | ............ B60W 30/04 |
| WO | WO-0028236 A1 * | 5/2000 | ............ B60G 17/08 |
| WO | WO-0201148 A2 * | 1/2002 | ............ G01B 5/255 |
| WO | WO-02081278 A1 * | 10/2002 | ............ B60T 8/1725 |
| WO | WO-2006079793 A1 * | 8/2006 | ........... G01D 5/2046 |
| WO | WO-2010052725 A2 * | 5/2010 | ............ H05B 6/664 |
| WO | WO-2012073760 A1 * | 6/2012 | ............ B62D 6/008 |
| WO | WO-2013069087 A1 * | 5/2013 | ........... H03F 1/3247 |
| WO | WO-2013115240 A1 * | 8/2013 | ............. H02P 21/02 |
| WO | WO-2014050382 A1 * | 4/2014 | ............... H04B 1/26 |
| WO | WO-2016075899 A1 * | 5/2016 | ............. B60T 8/171 |

OTHER PUBLICATIONS

The extended European search report dated Jul. 5, 2019, in corresponding European application No. 18211629.3; including partial machine-generated English language translation; 9 pages.

* cited by examiner

METHOD FOR OPERATING AN ONBOARD NETWORK OF A HYBRID MOTOR VEHICLE AND HYBRID MOTOR VEHICLE

FIELD

The invention relates to a method for operating an onboard network of a hybrid motor vehicle, wherein the onboard network is connected to an energy storage unit, especially a battery, an electric motor of a hybrid drive train that also comprises an internal combustion engine, and actuators of an electromechanical chassis system that can be operated as generators, wherein at least one reserve capacity of the energy storage unit is kept open for the supplying of electrical energy generated by at least one portion of the actuators to the onboard network. In addition, the invention relates to a hybrid motor vehicle.

BACKGROUND

Hybrid motor vehicles include in their hybrid drive train both an electric motor and an internal combustion engine. In this case, in particular, hybrid motor vehicles have also been proposed in which the power of the electric motor is rather low, so that the electric motor can be operated in an onboard network of medium voltage, such as 48 V. Such hybrid motor vehicles may also have electromechanical chassis systems situated at the same voltage level and thus are able to be connected to the same onboard network.

Electromechanical chassis systems comprise, for example, roll stabilizers and they usually have actuators, such as controllable dampers and/or stabilizers, in order to make possible different adjustments of the vehicle body with respect to the wheels, so that, for example, it is possible to balance out body movements and the like. Such actuators may for example comprise an electric motor or be an electric motor, wherein, in particular, one actuator is associated with each wheel.

As already mentioned, voltage levels above the 12 V commonly used in motor vehicles today are used for electromechanical chassis systems with rather high power demand. Thus, active wheel suspensions and/or active roll stabilization systems have already been proposed in the prior art that work with a voltage level of 48 V. These electromechanical chassis systems also basically afford the possibility, especially in the case of electric motors in the actuators, to operate the actuators as generators. A generator mode is advisable, for example, when a lifting movement of the vehicle body is to be braked by way of the actuator. It is then possible to convert mechanical kinetic energy into electrical energy, which once again is fed back into the energy storage unit of the onboard network of the electromechanical chassis system.

It has also already been proposed in the prior art to outfit shock absorbers or wheel suspensions in general with generator means for energy recovery in these places. For example, DE 10 2009 010 144 A1 discloses a method and a charging device for charging a motor vehicle battery, wherein a mechanical power on the vehicle suspension is converted into an electrical power. DE 10 2010 036 658 A1 concerns a device for converting kinematic energy into electrical energy by means of a movable vehicle component of a motor vehicle, wherein voltage peaks generated by means of the energy generating unit can be supplied as electrical energy to the energy storage unit, in order to charge the latter. The energy generating unit may take on the function of a movable vehicle component, such as a shock or vibration absorber.

For reasons of cost and packing space, in hybrid motor vehicles that also have an electromechanical chassis system operating at the same voltage level as the electric motor of the hybrid drive train, it is meaningful to utilize the onboard network components in association, and therefore to connect both the electric motor of the hybrid drive train and the actuators of the electromechanical chassis system operating as generators to the same onboard network. In such a hybrid motor vehicle, the energy storage unit of the onboard network will be cycled more heavily by the hybrid drive train and, in particular, in larger strokes than is usually the case for separate energy storage units that are only associated with the electromechanical chassis system.

In order to ensure a power feedback of the electrical energy during a generator mode of the electromechanical chassis system at all times, it had been proposed to keep on hand in static fashion a maximum power feedback potential of the electromechanical chassis system in the onboard network, especially as a reserve capacity of the energy storage unit. Such a reserve capacity, i.e., the static power feedback reserve, needs to be taken into account in the system design of the onboard network and can basically be implemented in two ways. A first option is to reduce the utilization rate of the existing onboard network for the hybrid system of the hybrid motor vehicle, and thus, in particular, to reduce the usable states of charge of the energy storage unit. However, this means a limiting of the utilization of electrical energy, so that the carbon dioxide characteristic of the motor vehicle is worsened, since the energy potentially fed back by recuperation by the hybrid drive train has to be limited.

Another possible solution is to enlarge the energy storage unit beyond the design size needed for the hybrid drive train. This ultimately means enlarging the energy storage unit of the onboard network by the static power feedback reserve of the electromechanical chassis system. Due to this enlarged design, the costs and expense for the onboard network increase significantly.

It should be noted that, for reasons of cost and packing space, a more complicated actuator itself is not desirable. For safety reasons, the actuators of the electromechanical chassis system cannot be switched off, and therefore electrical energy generated is basically supplied to the onboard network by transformation of mechanical energy.

SUMMARY

Therefore, the object of the invention is to make possible an improved energy management in an onboard network to which both an electromechanical chassis system and an electric motor of a hybrid drive train can be connected.

To achieve this object, it is provided in a method of the aforementioned kind according to the invention that the reserve capacity being held open is dynamically adapted as a function of at least one item of driver style information describing the driving style of the driver of the hybrid motor vehicle and/or at least one item of situation information describing the current and/or future operation of the hybrid motor vehicle.

According to the invention, it has been learned that the capacity demand for the power feedback from actuators of electromechanical chassis systems depends primarily on the road profile, the driver profile and the nature of the roadway. By linking corresponding situation information and driving style information with the energy management of the onboard network, for example, in an energy management controller, it is possible to estimate the currently required power feedback reserve, i.e., the reserve capacity to be kept open. In this way, the reserve capacity to be kept open can be dynamically adapted to the anticipated demand. For a smaller power feedback reserve of the electromechanical chassis system, the capacity freed up from the energy storage unit can be utilized by the hybrid system of the hybrid drive train, that is, capacity of the energy storage unit freed up by decreasing the reserve capacity can be provided to the electric motor. The energy storage unit of the onboard network of the hybrid motor vehicle can have a better workload in this way and also be smaller in design, without worsening the carbon dioxide characteristic of the hybrid motor vehicle.

It should further be noted that essentially passive regeneration elements of a chassis system, such as the vehicle components that can feed back energy as mentioned in DE 10 2009 010 144 A1 or DE 10 2010 036 658 A1 may also be interpreted and used as actuators in the sense of the invention. However, special benefits result in the context of the present invention chiefly for actual, i.e., actively controllable actuators, such as those having an actuator electric motor, since, in their present form and owing to their design, these basically feed back energy generated to the onboard network and a costly redesign would be needed to avoid this process. The electromechanical chassis system is therefore, in particular, an active chassis system.

A power feedback reserve and hence the reserve capacity being held open is also usually referred to a period of time, especially a prediction period, such as one for which it is assumed that the current driving situation remains the same and/or is predictable in regard to the energy that can be recovered through the actuators. For example, as will be further explained in the following, if it is discovered from digital map material of a navigation system of the motor vehicle that an uneven country road of poor roadway quality lies ahead, providing a large amount of convertible mechanical energy, without this being compensated by energy to be consumed, a larger power feedback reserve will result. Accordingly, in the context of the present invention, it may also be advisable to likewise dynamically select a period to which the reserve capacity being held open is related, in particular, one that is based on the situation information describing the future operation of the motor vehicle. For example, if it is known in advance how long a heavily curved downhill stretch of road will last, in which more energy is generated on the part of the actuators than is consumed, and furthermore, no particular consumption is expected from the electric motor, one may keep on hand an available reserve capacity for this stretch of road; a "period" may also be described in this case by a length of road to be driven on.

It should furthermore be noted in this place that too small a dimensioning of the reserve capacity of the energy storage unit to be held open need not necessarily result in an overloading of the onboard network, since steps exist for generating energy sinks within the onboard network when needed, for example, an operation of the electric motor, even though this would not be necessary or energy-efficient in the current situation.

In one appropriate embodiment of the present invention, the situation information used may be a road class and/or roadway quality of the current and/or future road that is driven on. In one possible simple realization, for example, a static classification of the power feedback reserve (high, medium, low) can be based on road types (such as city traffic, highway, curving country road) in connection with a regulating strategy for the electromechanical chassis system. However, a dedicated analysis also involving, in particular, other properties of the road ahead is preferred, as shall be explained further below. Road classes may include, for example, a city traffic class and/or a highway class and/or a curving country road class and/or a less curving country road class and/or an offroad class. It is especially preferable when the road class is provided by a navigation system of the motor vehicle, especially from digital map material of the navigation system in concert with a current position of the motor vehicle, which can be determined, for example, by means of a GPS sensor or, in general, a GNSS sensor.

An especially advantageous embodiment of the present invention calls for the situation information being a predictive power feedback demand for the future that is determined as a function of route information describing a future route of the hybrid motor vehicle and provided, in particular, by a navigation system of the hybrid motor vehicle, especially taking into account road classes and/or the nature of roadways along the route. While the knowledge as to the road currently being driven upon by means of digital map material from the navigation system is already expedient for estimating the anticipated power feedback potential of the electromechanical chassis system, an even better prediction can be made by linking this to the route planned via the navigation system. In particular, in this way, it can not only be estimated how long the current driving situation of the hybrid motor vehicle will continue, but also a power feedback demand can already be predicted by taking into account the subsequent sections of road as well as their road class/roadway nature, which in turn can be taken into account for the upcoming road section and the reserve capacity needing to be kept open therefor. With special advantage, it is therefore possible to determine a reserve capacity curve along the route describing the future reserve capacities as a function of the predictive power feedback demand.

A further improvement results when, in addition, a predictive charge state of the energy storage unit and/or a recuperation potential of the electric motor along the route is also determined and taken into account when determining the reserve capacity to be kept open. For example, if a low state of charge of the energy storage unit is expected in any case, based on a planned frequent use of the electric motor, it is easily possible to accommodate any energy generated by the actuators as generators. Information as to the additional influence of the electric motor of the hybrid drive train can moreover also be considered when smoothing out the reserve capacity curve along the route, so that, for example, short sections of a road class, especially when a relatively empty energy storage unit is expected in any case, do not necessarily result in an adapting of the reserve capacity to such sections.

With particular advantage, however, a mutual coupling of the prediction in regard to the electric motor and the prediction in regard to the electromechanical chassis system is possible, in order to improve the efficiency of the energy management overall. Thus, an especially preferred embodiment of the present invention calls for taking into account also the predictive power feedback demand during a forecasting of the operation of the hybrid drive train as a function of the recuperation potential of the electric motor along the route. It is already known in the prior art how to establish predictive operating strategies for hybrid drive trains based on a known route. Such operating strategies involve, for example, when and to what degree the electric motor should contribute to the propulsion, when and how much recuperation should be carried out by the electric motor, and so forth. Now, it is also known what the future energy budget of the electromechanical chassis system looks like, especially the regenerated energy obtainable from it, and this also can be taken into account with respect to the operating strategy, in order to make possible an overarching energy optimization of the efficiency. For example, if it is known in advance that additional electrical energy will be obtained from the actuators of the electromechanical chassis system in generator mode, a consumption of this energy can be factored into the plan, for example, in order to limit the fuel consumption on the part of the internal combustion engine, even if the use of the electric motor would not be optimal for efficiency. In such a form, therefore, an especially efficient operation of a hybrid system combined with an electromechanical chassis system is achieved. In order to improve the energy management of the overall onboard network, the described information of the electromechanical chassis system can be related to predictive regeneration potentials from the recuperation function of the hybrid drive train.

A general advantageous enhancement of the present invention calls for the driving style information to describe the driving style of a current driver in regard to vehicle body movements of the hybrid motor vehicle. For example, if the driver has a tendency for sporty, dynamic driving style, less feedback of electrical energy through the actuators is to be expected, which may instead require more energy for their operation. On the whole, therefore, the driving style information ultimately describes how much mechanical motion is predictably induced by the driving style of the driver, motion that can be transformed into electrical energy, for which it is possible to investigate, for example, how hard the driver accelerates/brakes, how fast he takes curves, and so on. Corresponding procedures for classifying drivers in terms of their driving style are already well known in the prior art and may also be used accordingly in the context of the present invention.

Moreover, it is advantageous for the situation information used to be a dynamically and/or user-controlled adjustable operating parameter of the electromechanical chassis system. Such an operating parameter may describe, for example, how much energy consumption by the actuators of the electromechanical chassis system is to be expected, especially as compared to the existing power feedback potential. For example, it has already been proposed in the prior art to give the driver the possibility to attune the electromechanical chassis system to a more sporty driving style or to a more comfort-oriented driving style. Such operating modes, usually describing several operating parameters of the electromechanical chassis system, enable predictions as to how much energy will be presumably required for the actuators, for example, due to stronger required damping, and which situations may arise in which the actuators generate energy (especially by undamped vehicle body movements), so that there is an obvious influence on the power feedback reserve, and hence the reserve capacity to be kept open, which can be used by a corresponding modification factor, which can be derived from the at least one operating parameter. Hence, the dynamically or driver-influenced regulating strategy of the electromechanical chassis system can be taken into account in its influence on the power feedback potential, in order to allow an even more precise prediction.

In one especially advantageous embodiment of the present invention, it may be provided that, in order to decrease the state of charge of the energy storage unit, especially to realize an increased reserve capacity, a portion of the energy from the energy storage unit is output to a low-voltage network of the hybrid motor vehicle by way of a d.c. voltage converter. Besides the onboard network described here, to which the electric motor of the hybrid drive train and the actuators of the electromechanical chassis system are connected, and which may have, for example, a voltage level of 48 V, hybrid motor vehicles usually also have at least one other onboard network of lower voltage, hence the low-voltage network. While it would be basically disadvantageous to shift electrical energy to the low-voltage side, in exceptional instances, when a particularly high energy input has been determined on the part of the electric motor and/or the actuators, it may be advisable to shift the energy obtainable or obtained to the low-voltage side, instead of shedding it or utilizing it less efficiently elsewhere. In particular, the method according to the invention also allows a decreasing of the state of charge of the energy storage unit to be brought about when there exists a high recuperation potential on the part of the electric motor in the sense of a joint energy management for the hybrid drive train and the electromechanical chassis system. In such cases as well, electrical energy can thus be shifted to the low-voltage network, for example, in order to charge a corresponding low-voltage battery.

Also directly associated with opening up such additional possibilities, such as energy shifting to a low-voltage side, the benefits are revealed for a unified energy management approach for an onboard network, to which the actuator of an electromechanical chassis system and an electric motor of a hybrid drive train are connected. Not only can power feedback potentials and consumption potentials be turned into a mutually attuned energy management strategy, but also different possibilities can be utilized, in the sense of an overall energy optimization, to remove energy from the onboard network, especially by the usually rather undesirable process of shifting electrical energy to a low-voltage network. A corresponding energy management strategy is meaningful, for example, when a downhill drive (high power feedback potential of the hybrid drive train) on a curved stretch of road (high power feedback demand of the electromechanical chassis system) is present.

In addition to the method, the invention also relates to a hybrid motor vehicle, comprising an onboard network, which is connected to an energy storage unit, especially a battery; an electric motor of a hybrid drive train, which also comprises an internal combustion engine; and actuators of an electromechanical chassis system that are operated as generators; wherein the onboard network is coordinated with an energy management controller of the hybrid motor vehicle, which is designed to carry out the method according to the invention. All the embodiments pertaining to the method according to the invention may be applied analogously to the hybrid motor vehicle according to the invention, with which the already mentioned benefits can therefore also be achieved.

BRIEF DESCRIPTION OF THE DRAWINGS

Further benefits and details of the present invention will emerge from the exemplary embodiments described in the following as well as on the basis of the drawing. Shown therein are.

DETAILED DESCRIPTION

Figure 1:
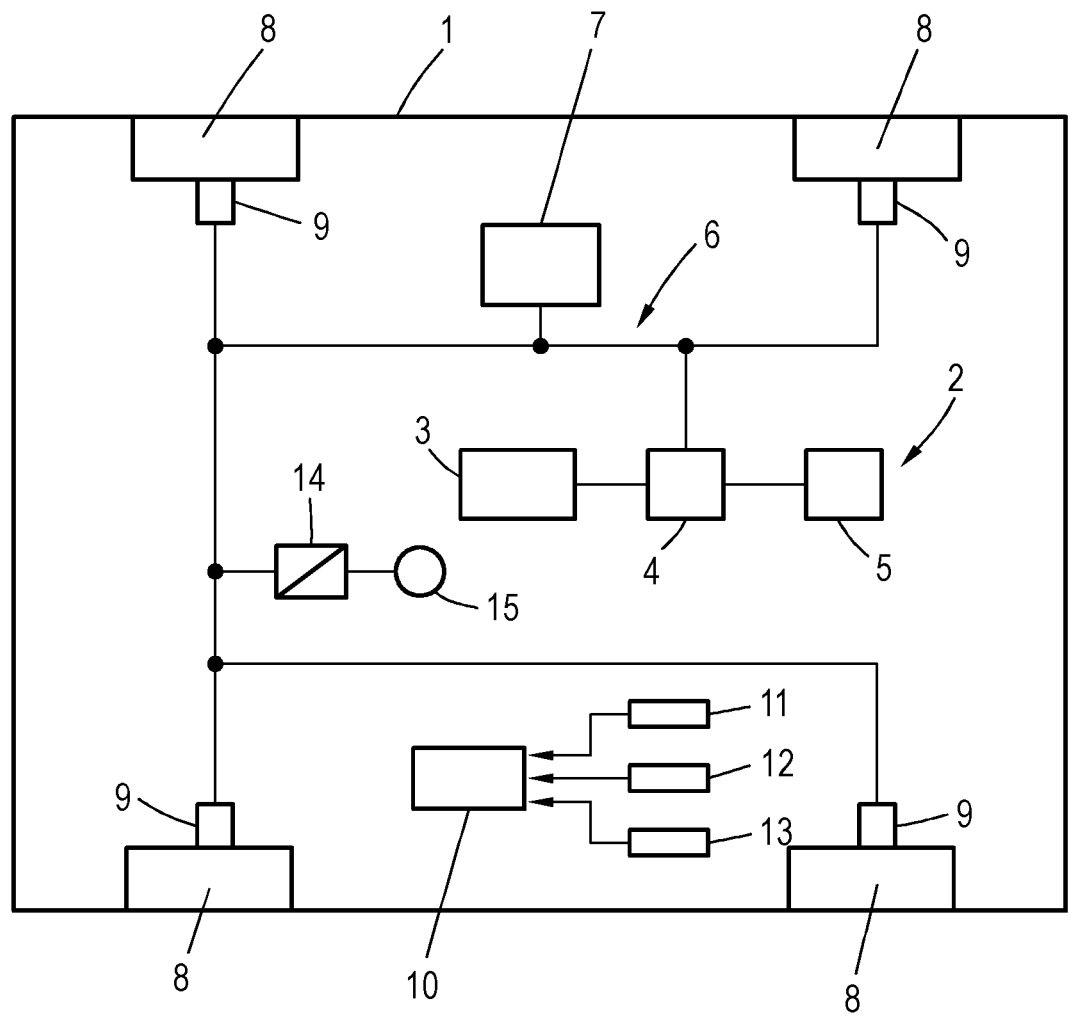
FIG. 1 a schematic diagram of a hybrid motor vehicle according to the invention, and FIG. 2 a sketch to explain the method according to the invention.

FIG. 1 shows a schematic diagram of a hybrid motor vehicle 1 according to the invention. This vehicle has a hybrid drive train 2, among the components of which are shown an internal combustion engine 3, an electric motor 4 and a transmission 5 in the present case. The electric motor 4, which, of course, can also be operated as a generator for recuperation, is utilized here at a voltage level of 48 V and is connected to a corresponding onboard network 6, in which a rechargeable electrical energy storage unit 7 is present as a battery here.

However, in the present case actuators 9 associated with individual wheels 8 are also connected to the onboard network 6, and the actuators 9 can also be operated as generators. The actuators 9 may be stabilizers, dampers, or the like, and, in particular, they may themselves have an actuator-electric motor. The actuators 9 may be controlled in the resulting active electromechanical chassis system in order to adapt the height of the bodywork to the wheels 8, for example to balance out vibrations, or the like. For example, the electromechanical chassis system may also have a roll stabilizing action.

The onboard network 6, which thus has an overall voltage level of 48 V, is coordinated with an energy management controller 10, which is connected to other vehicle systems and can receive information from them, systems such as a navigation system 11, a driver information system 12, which can provide a driving style information, as well as other vehicle systems 13, which can provide, for example, situation information based on sensor data, especially as regards the nature of the roadway and the section of road up ahead, which can also be predicted from camera data.

Figure 2:
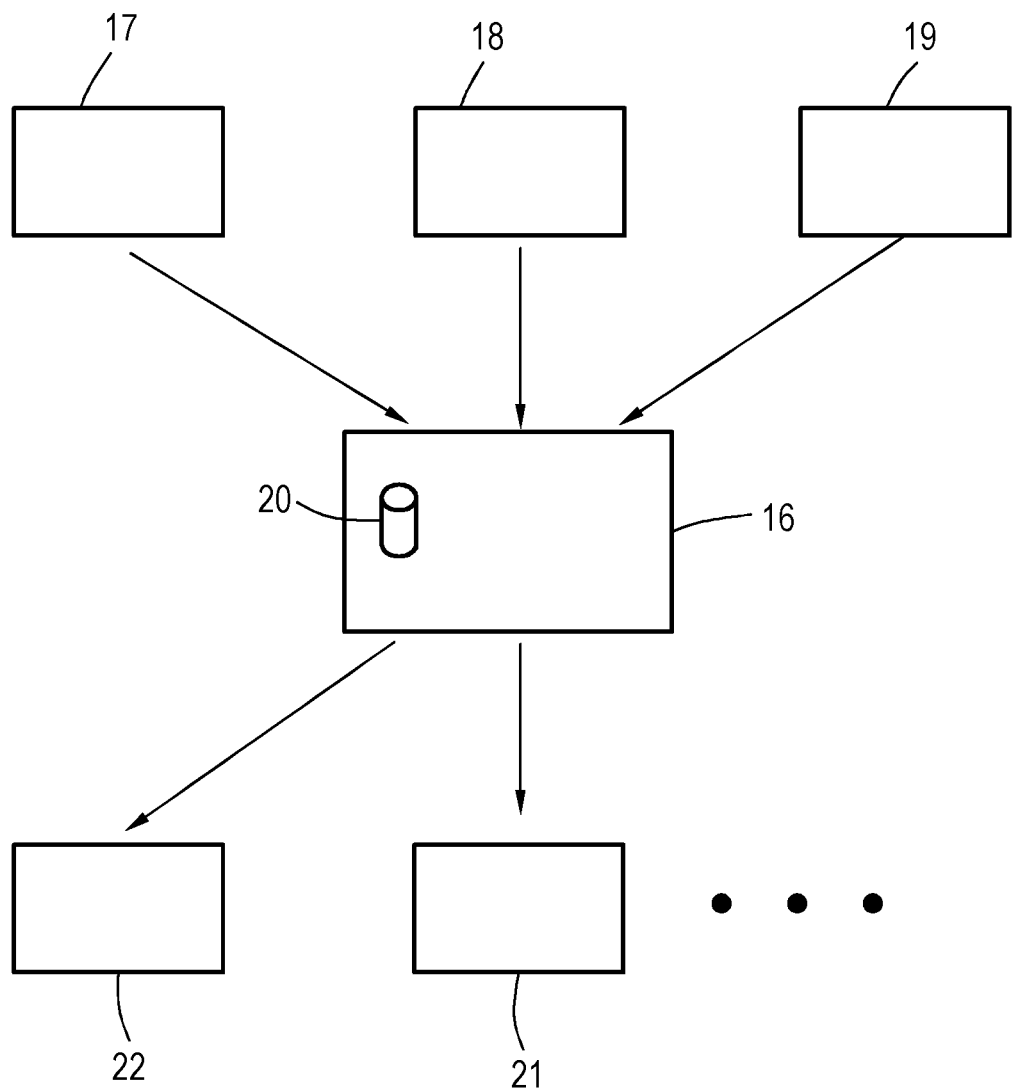

Further, the onboard network 6 is connected by way of a d.c. voltage converter 14 to a low-voltage network 15 of the hybrid motor vehicle 1, merely suggested here, which can have, for example, a voltage level of 12 V. The energy management controller 10 is designed to carry out the method of the invention, which shall be explained more closely with the aid of the summary sketch of FIG. 2.

The actual energy management is indicated by a central step 16, which uses various input information, regarding both the hybrid drive train 2 and the electromechanical chassis system or its actuators 9, in order to carry out a unified energy management taking into account both connected systems. Essential input information comes from a prediction, indicated by means of step 17, based on situation information about the road class and the nature of the roadway. In this case, in particular, based on a route provided by the navigation system 11 plus additional information for as long a period as possible in the future, a prediction is made in the present case for the power feedback demand of the actuators 9, the power demand of the actuators 9, a power demand of the electric motor 4, and a recuperation potential of the electric motor 4, especially along the route. It is also possible to infer here the trend of the state of charge of the energy storage unit 7. Additional input information of step 16, concerning, in particular, the electromechanical chassis system, is driving style information 18 about the driving style of the driver, and operating parameters 19 of the electromechanical chassis system, especially an operating mode selected by the user.

It should be noted that a number of additional items of input information may also be called upon, of course, as long as these are useful for the energy management.

Now, the energy management in step 16 also involves, in particular, the determination of a reserve capacity 20 of the energy storage unit 7 that is to be kept free, in order to meet the power feedback demand of the electromechanical chassis system. This means that electrical energy generated by the actuators 9 can basically be accommodated in the onboard network 6, specifically at least partly in the energy storage unit 7. The reserve capacity 20 to be kept open is dynamically adapted, for example, after more power feedback demand is present by the actuators 9 on a curved stretch of road than on a straight, smooth drive, for example, on a highway. If the reserve capacity 20 kept open thus far is released over the course of time, this is provided to the electric motor 4 and thus to the hybrid system. This enables a better utilization of the available capacity of the energy storage unit 7. The determination of the reserve capacity 20 to be kept open also includes, in particular, the driving style information 18 and the operating parameters 19, especially in the form of correction factors.

However, the energy management of step 16 goes far beyond a dynamic variation of the power feedback reserve, i.e., the reserve capacity 20 to be kept open. The power feedback demand of the actuators 9 is also taken into account in regard to determining an operating strategy for the hybrid drive train 2, together with the recuperation potential of the electric motor 4, especially in order to keep the fuel consumption by the internal combustion engine 3 as low as possible, so that energy predictively fed back from the actuators 9 can also be used as much as possible. Not only an operation of the electric motor 4, as indicated in step 21, can be considered as a way of removing electrical energy from the onboard network 6, but also it is possible in the context of the present invention to create the reserve capacity 20 to be kept open or to consume the immediately generated energy of the actuators 9 or even, in order to use the recuperation potential of the electric motor 4, as indicated in step 22, to shift electrical energy by way of the d.c. voltage converter 14 from the onboard network 6 to the low-voltage network 15, for example, in order to charge a low-voltage battery there.

In particular, due to the interlinked energy management with simultaneous consideration of the electromechanical chassis system and the hybrid system, a significant improvement results in the energy budget, so that, in other words, it can be said that an overarching energy optimization of the efficiency is made possible by the interlinking of the power feedback demand of the electromechanical chassis system as a function of the road and driver profiles or the nature of the roadway with the operating strategy of the hybrid system.

It should be further pointed out here that already known concepts or algorithms may also basically be applied, at least for hybrid systems as such, in the context of the present invention, for predicting the recuperation of the electromechanical chassis system. By analogy with the electric motor 4 and its recuperation, certain sections of road can be assigned mean regeneration rates, for example, given a knowledge of their properties, and these can then be adapted with correction factors depending on the driving style information, or the like. In the context of their use for determining an operating strategy for the hybrid drive train 2, power feedback demands determined for the electromechanical chassis system can ultimately be added to the power feedback potential of the electric motor 4, possibly with additional consideration of the consumption of the actuators 9 or the electric motor 4. In this way, using known knowledge, a specific implementing of the approaches of the invention is possible.

The invention claimed is:

1. A method for operating an onboard network of a hybrid motor vehicle,
    wherein the onboard network is connected to an energy storage unit, especially a battery; an electric motor of a hybrid drive train, which also has an internal combustion engine; and actuators of an electromechanical chassis system that can be operated as generators,
    wherein the actuators of the electromechanical chassis system that can be operated as generators are provided to adjust a body of the hybrid motor vehicle with respect to at least one wheel,
    wherein at least one reserve capacity of the energy storage unit is kept open for receiving electrical energy generated by at least one portion of the actuators to the onboard network so that the at least one portion of the actuators do not over-charge the energy storage unit when generating electrical energy,
    wherein the reserve capacity being held open is dynamically adapted as a function of at least one item of driver style information describing the driving style of the driver of the hybrid motor vehicle, a user-controlled adjustable operating parameter of the electromechanical chassis system, and at least one item of situation information describing the current and/or future operation of the hybrid motor vehicle,
    wherein, in order to decrease a state of charge of the energy storage unit and correspondingly increase the at least one reserve capacity, energy is output from the energy storage unit by way of a DC voltage converter to a low-voltage battery provided on a low-voltage network of the hybrid motor vehicle,
    wherein the at least one item of situation information comprises a roadway quality which describes an expected amount of energy convertible by the electromechanical chassis system and which is determined from environmental information captured by a sensor of the hybrid motor vehicle.

2. The method as claimed in claim 1, wherein capacity of the energy storage unit that is freed up by decreasing the reserve capacity is provided to the electric motor.

3. The method as claimed in claim 1, wherein the situation information used is a road class and/or nature of the roadway of the current and/or future road that is driven on.

4. The method as claimed in claim 3, wherein the road classes used are a city traffic class and/or a highway class and/or a curving country road class and/or a less curving country road class and/or an offroad class, and/or the road class is provided by a navigation system of the hybrid motor vehicle.

5. The method as claimed in claim 1, wherein the situation information is a predictive power feedback demand for the future that is determined as a function of route information describing a future route of the hybrid motor vehicle and provided in particular by a navigation system of the hybrid motor vehicle especially taking into account road classes and/or the nature of roadways along the route.

6. The method as claimed in claim 5, wherein a reserve capacity curve along the route describing the future reserve capacities is determined as a function of the predictive power feedback demand.

7. The method as claimed in claim 6, wherein a predictive state of charge of the energy storage unit and/or a recuperation potential of the electric motor along the route is also determined and taken into account when determining the reserve capacity to be kept open.

8. The method as claimed in claim 7, wherein the predictive power feedback demand is also taken into account during an advanced planning of the operation of the hybrid drive train as a function of the recuperation potential of the electric motor along the route.

9. The method as claimed in claim 1, wherein the driving style information describes the driving style of a current driver in regard to vehicle body movements of the hybrid motor vehicle.

10. The method as claimed in claim 1, wherein a decreasing of the state of charge of the energy storage unit is also brought about when there exists a high recuperation potential on the part of the electric motor.

11. A hybrid motor vehicle, comprising:
    an onboard network, which is connected to an energy storage unit, especially a battery;
    an electric motor of a hybrid drive train, which also has an internal combustion engine; and
    actuators of an electromechanical chassis system that can be operated as generators, wherein the onboard network is associated with an energy management controller of the hybrid motor vehicle, which is designed to carry out a method as claimed in claim 1.

12. The method as claimed in claim 1, wherein the sensor is a camera of the hybrid motor vehicle.

* * * * *